United States Patent [19]

Eadens

[11] 4,343,093
[45] Aug. 10, 1982

[54] PLUMB TOOL

[76] Inventor: Richard L. Eadens, 204 Magnolia Ave., Jeffersonville, Ind. 47130

[21] Appl. No.: 237,345

[22] Filed: Feb. 23, 1981

[51] Int. Cl.³ .......................... G01C 9/28; G01C 9/36
[52] U.S. Cl. ........................................ 33/373; 24/299
[58] Field of Search .................................. 33/370–373; 24/299

[56] References Cited

U.S. PATENT DOCUMENTS

| | | | |
|---|---|---|---|
| 312,266 | 2/1885 | Gurley | 33/373 |
| 3,729,778 | 5/1973 | McGrath | 24/299 |
| 3,826,013 | 7/1974 | Baker | 33/373 |

FOREIGN PATENT DOCUMENTS

| | | | |
|---|---|---|---|
| 808864 | 3/1969 | Canada | 24/299 |
| 417982 | 2/1967 | Switzerland | 33/373 |

*Primary Examiner*—Charles E. Phillips
*Attorney, Agent, or Firm*—Richard L. Caslin

[57] ABSTRACT

A measuring instrument is disclosed that is to be attached to an object that is to be plumbed so as to free both hands of the user for positioning and securing the object while the user maintains a visual check on the bubble level for precise plumbness. This plumb tool invention comprises a body member having a pair of right-angular arms for use in engaging the object that is to be plumbed. A ledge projects from one arm and supports an orbital bubble level. A bead chain is attached at one end to the body member and adapted to encircle an object that is to be plumbed. There is a keeper for engaging the bead chain along the length thereof for mounting the plumb tool to the object being plumbed with a quick-attachment and quick-release capability.

4 Claims, 5 Drawing Figures

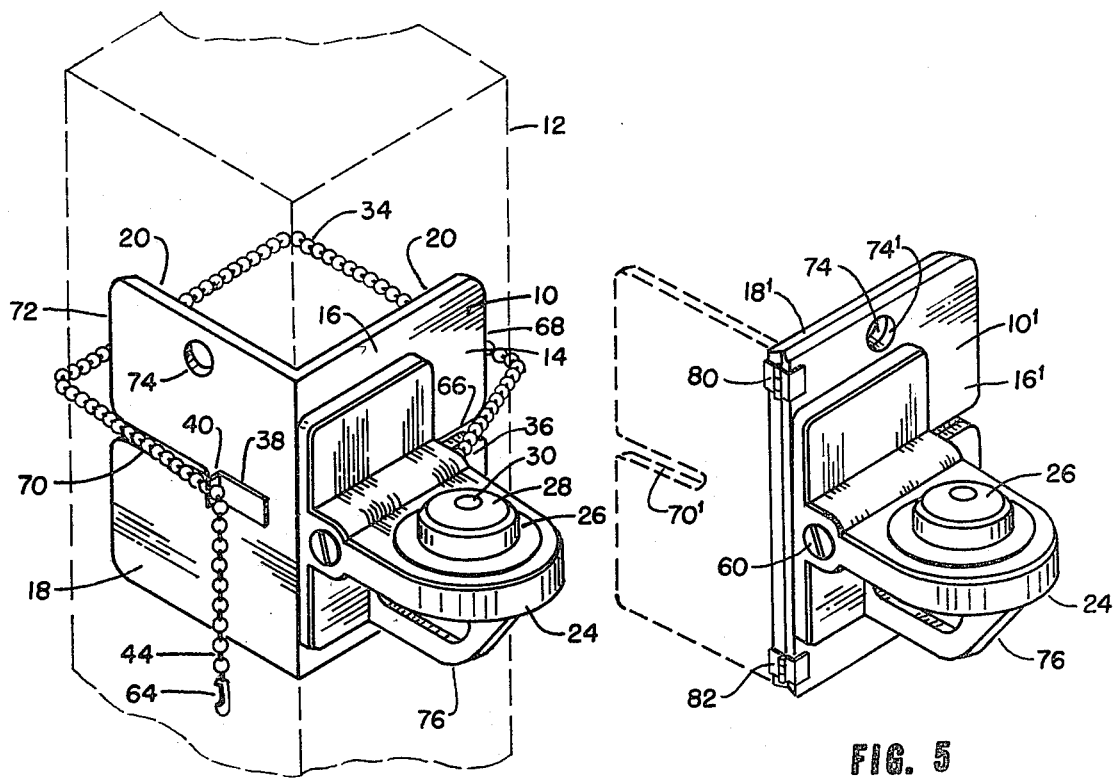
FIG. 1
FIG. 5
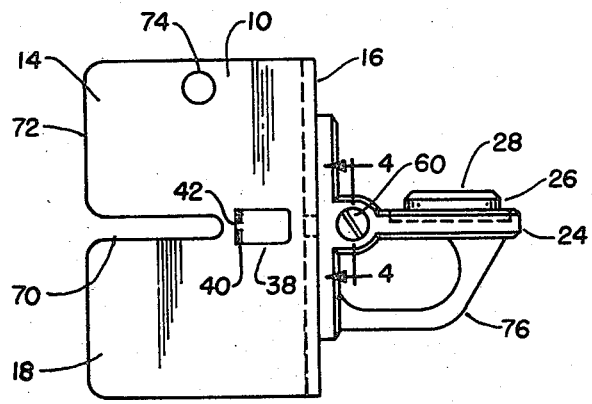
FIG. 2
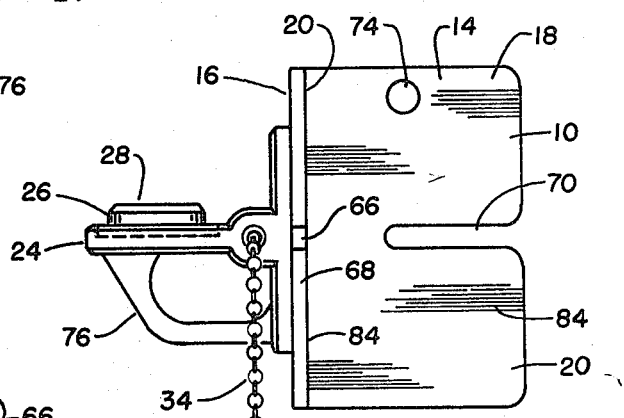
FIG. 3
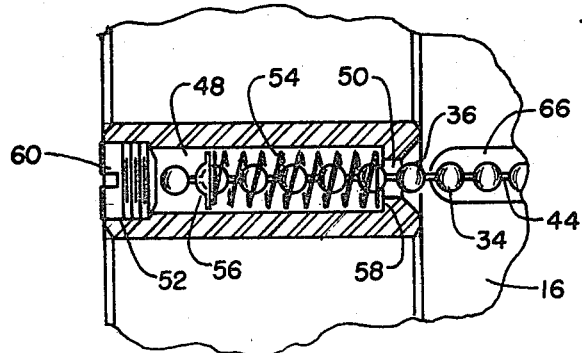
FIG. 4

PLUMB TOOL

BACKGROUND OF THE INVENTION

1. Field of the Invention

This invention relates to measuring instruments and particularly to a tool for finding a vertical line for use by carpenters, builders, plumbers, and similar craftsmen.

2. Description of the Prior Art

There are many patents in the art of measuring instruments relating to tools for leveling and squaring functions, many using bubble type levels.

The Baher U.S. Pat. No. 3,826,013 describes a multi-purpose tool that may be used to level, square, and plumb various cylindrical, curved, inclined, and planar-shaped objects. This Baher tool has a body member with right-angular arms for forming a vertical elongated groove that is adapted to engage and accommodate any object, such as a post, rod, pipe, or conduit. There is also a horizontal shelf for supporting a bubble level or a target type "bulls-eye" liquid vial for use in leveling or plumbing an object being measured or positioned. A handle is disposed beneath the horizontal shelf for grasping by the user. This patent does not illustrate a means for attaching the tool to the object being measured so as to free up both hands of the user, as in the present invention.

The Dodson U.S. Pat. No. 2,541,641 describes an adjustable bubble level that is mainly for use in checking rotatable machine elements, such as shafts, pulleys, flywheels, fan rotors, gears, and the like. This patent has a base member in the form of an inverted V-block which is adapted to straddle and fit over the rotatable machine element such as a shaft. The V-block has a vertical post for supporting a vial yoke that in turn carries the level vial. The level of this patent is for determining a horizontal position, rather than in finding a plumb line, as in the present invention. The V-block of this patent is held to the shaft by means of a flexible chain that is attached at one end to the block, and at the other end is provided with an adjustable wing nut for engagement with the adjacent end of the V-block.

The Jackson U.S. Pat. No. 392,124 describes a spirit level that is capable of ready attachment to a vertical rod or plumb rules. A series of three wood screws are used for mounting the level to the vertical leveling rod or pole.

The Geier U.S. Pat. No. 2,356,311 describes an orbital bubble level of the general type that is employed in the present invention, and it is only one element of the combination which embodies the present invention. It is generally a commercially available item which happens to be useful in carrying out the present invention.

The Zipser U.S. Pat. No. 2,757,458 describes a bubble level for attachment to a portable electric drill, where the level may be angularly adjusted with respect to the drill so that the drill is capable of drilling holes at predetermined angles without requiring the use of a drill press.

The Weichert U.S. Pat. No. 2,806,296 is another patent showing a bubble level for attachment to a portable electric drill which enables the drill operator to guide the drill at any angle with respect to the horizontal.

OBJECTS OF THE PRESENT INVENTION

The principal object of the present invention is to provide a plumb tool, which is simple and compact in configuration, which is accurate and reliable in operation, and which may be readily attached to the object being vertically aligned so as to free up the user's two hands for use in installing the vertical member that is being installed.

A further object of the present invention is to provide a plumb tool of the class described wherein a quick-release fastening means is combined with the tool for ease in installing the tool to the object being plumbed, as well as for ease in removing the tool after the job is done.

A further object of the present invention is to provide a plumb tool of the class described where the flexible mounting means for mounting the tool to the object being plumbed may be easily extended so that the tool could be adapted for use with oversized objects, such as storage tanks, large mechanical assemblies such as air-conditioning housings, factory equipment, and the like.

A further object of the present invention is to provide a plumb tool of the class described that employs an orbital bubble level that is able to indicate plumbness in two horizontal directions at 90 degrees from each other so that the tool need not be shifted from one direction to the other in order to obtain a substantially vertical positioning of the object to be plumbed.

A further object of the present invention is to provide a plumb tool of the class described using a flexible elongated strap means that is capable of mounting the tool to both thin and thick objects that are to be plumbed.

A further object of the present invention is to provide a plumb tool of the class described where the flexible strap member has a resilient tension capability that is built-in for ease of assembly and disassembly.

A still further object of the present invention is to provide a plumb tool of the class described where certain portions may be hinged so as to fold into a compact size for storage during non-use.

SUMMARY OF THE INVENTION

The present invention provides a plumb tool that is adapted to be mounted to the object that is being plumbed. This tool has a body member formed of rigid material with a pair of right-angular arm portions, where each arm has a substantially flat inner surface for use in engaging an object that is to be plumbed. A ledge projects outwardly from one arm portion and supports an orbital bubble level that measures plumbness in all directions measured from a vertical axis. A flexible elongated strap member is attached at one end to the body member and is adapted to encircle the object that is to be plumbed. A keeper is mounted on the other side of the tool for engaging the strap member along the length thereof so the tool has a quick-attachment and quick-release capability.

BRIEF DESCRIPTION OF THE DRAWINGS

This invention will be better understood from the following description taken in conjunction with the accompanying drawings and its scope will be pointed out in the appended claims.

FIG. 1 is a perspective view of a plumb tool embodying the present invention showing the tool mounted to a vertical post that is illustrated in phantom lines.

FIG. 2 is a left-side elevational view of the plumb tool shown in FIG. 1, where the bead chain that serves as the flexible strap member is not visible.

FIG. 3 is an elevational view that is looking at the opposite side of the plumb tool, as is illustrated in FIG.

2. Notice a fragment of the bead chain that serves as the flexible strap member is illustrated.

FIG. 4 is a fragmentary, cross-sectional view of the bore hole that is located in the ledge of the tool, and this view is taken on the line 4—4 of FIG. 2.

FIG. 5 is a perspective view of a second modification of the present invention showing the pair of right-angular arm portions of the body member being hinged together along a central vertical axis, with one arm portion folded or collapsed upon the other so the tool assumes a more compact shape for storing during non-use. Shown in phantom lines is one of the arm portions in its use position for engagement of the object that is to be plumbed.

DESCRIPTION OF THE PREFERRED EMBODIMENTS

Turning now to a consideration of the drawings, and, in particular, to the perspective view of FIG. 1, there is shown a plumb tool 10 that is illustrated as being mounted temporarily to a vertical post 12 that is shown in phantom lines. This plumb tool 10 has a body member 14 that is formed of a suitable rigid material, such as die-cast aluminum or perhaps a molded thermoplastic material. The body member has a pair of right-angular arm portions 16 and 18, and each arm has an inner surface 20 that is substantially flat for use in engaging the object that is to be plumbed, such as the vertical post 12.

A horizontal ledge 24 projects outwardly from the arm portion 16, and supported on the top surface thereof is an orbital bubble level 26, which is of standard construction and available on the market today. This bubble level may also be described as a target type "bulls-eye" 360 degree liquid vial, that is very similar in design to the bubble level shown in the above-described Geier U.S. Pat. No. 2,356,311. The top portion 28 of the level is transparent for viewing the bubble that is in the liquid that fills the level. There is also inscribed a small circle 30 in the center of the transparent top to serve as a target or bulls-eye for positioning the bubble in the center of the circle to obtain precise vertical positioning.

There is a flexible elongated strap member 34 in the form of a bead chain that is attached at one end 36 to the body member and it is adapted to encircle the object that is to be plumbed, such as the vertical post 12. A clip member 38 is attached to the outer surface of the other arm 18 to serve as a keeper means for engaging the bead chain 34 along the length thereof for holding the plumb tool mounted tightly against the vertical post 12 with a quick-attachment and quick-release capability. This clip member 38 would best be a mild spring steel that would be riveted to the outer surface of the arm 18. This clip member includes a perpendicular flange 40 having a slot 42 for receiving the central cord 44 of the bead chain 34 therein, as is best seen by comparing FIGS. 1 and 2.

For an understanding of how the end 36 of the bead chain 34 is attached to the body member 14, attention is directed to the cross-sectional view of FIG. 4 that is taken on the line 4—4 of FIG. 2. The horizontal shelf 24 is of thickened cross section in the vicinity of the arm portion 16, as is best seen in FIGS. 1 and 2. Within this thickened cross section is a bore hole 48 that has a small opening 50 at one end and a larger threaded opening 52 at the opposite end. First, the attached end 36 of the chain 34 is fed through the small opening 50 and pulled through the bore hole 48 and out the other opening 52. Then a helical compression spring 54 is slipped over the end of the chain, and then a split spring-retaining clip 56 is slipped between two adjacent beads and onto the central cord 44 and clamped in place so as to retain the spring 54 between the clip 56 and the end wall 58 which has the small opening 50 therein. Then a pull is exerted on the chain 34 so as to draw the spring 54 and the clip 56 into the bore hole 48, as seen in FIG. 4. In order to prevent the chain from becoming dislodged from the bore hole 48, the larger opening 52 is closed by a set screw 60. Thus, it will be seen that the attachment end 36 of the bead chain 34 is provided with a resilient longitudinal support, as explained in the description of FIG. 4, so that when the bead chain is engaged with the clip member 38, a certain tension is exerted on the chain to form a reliable mounting means for the plumb tool 10 to the object being plumbed, such as the post 12. Thus, hammer blows can be applied to the post to drive it into the ground without doing damage to the plumb tool or causing it to move out of alignment. One important advantage of using a bead chain 34 is that the clip member 38 may be employed to have a locking engagement with the chain along any length thereof. Moreover, the bead chain 34 comes with a coupler 64 of standard construction so that an additional length of chain (not shown) may be added to the original chain so that the plumb tool 10 may be assembled to a much larger device, whether it is a household refrigerator, a central air-conditioning unit, an air-handling blower assembly, and the like.

Means are also provided so that this plumb tool 10 can be used with small transverse dimensions, such as water pipe, electrical conduits, sign posts, hand rails, and the like. Notice in FIGS. 1–3 that the right-angular arm portion 16 has a horizontal slot 66 which is open at the outermost edge 68 of the arm. This slot 66 is located generally in the same horiziontal plane as the bore hole 48, as is best seen in FIG. 4. Hence, the bead chain 34 may extend through the slot 66 if the object being plumbed is of smaller dimensions than the width of the arm 16. A similar horizontal slot 70 is formed in the other right-angular arm portion 18, and this slot is open to the outermost edge 72 of the arm 18. Moreover, the slot 70 is generally in the same horizontal plane as the other slot 66, as is clear from FIG. 1.

It should be appreciated that when the plumb tool 10 is not in use, the bead chain 34 may be wound around the tool several times and the free end of the chain may be inserted into the clip member 38 so that the chain does not become entangled. Another convenience feature is the addition of a nail hole 74 in the arm 18 so that the tool may be hung on a hook or nail mounted in the wall of the user's workroom for storage purposes.

Another convenience item is associated with the ledge 24. Beneath the ledge is a reinforcement 76 extending between the arm 16 and the ledge to brace the ledge. This reinforcement serves also as a handle for use in carrying and holding the tool up to the object that is to be plumbed for ease in attaching the bead chain around the object.

A second modification of the present invention is illustrated in FIG. 5, wherein identical elements are given the same reference numeral as in the preferred embodiment of this invention of FIGS. 1–4. The main feature of this second modification is that the two right-angular arm portions 16' and 18' are hinged together about a central vertical axis on the line that is common with both arms. A pair of small vertical hinge members 80 and 82 are shown so that the arm portion 18' is movable between two extreme positions; namely, a right-angular position which is shown in dotted lines in FIG. 5, and a collapsed position which is shown in full lines where the two arm portions are stacked together in a sandwich. This renders the plumb tool 10' of this second modification a very compact design for use in storage when the tool is not in use. Notice also that the nail hole 74 of FIG. 1 has been duplicated in the second arm portion 16' of FIG. 5 so that the tool 10' may be hung on a nail or hook.

Looking again at FIG. 3, the inner surface of both right-angular arm portions 16 and 18 are shown with etched horizontal lines 84 that are similar to serrations for grasping the object that is to be plumbed, such as a vertical post, as a slight form of interlocking so as to prevent slippage of the tool on the post.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A plumb tool that is adapted to be mounted to the object that is being plumbed, said tool comprising:
   a. a body member of a substantially rigid material having a pair of right-angular arm portions, each arm having a substantially flat inner surface for use in engaging an object that is to be plumbed;
   b. a ledge projecting outwardly from one arm portion and supporting an orbital bubble level on the top surface thereof in a substantially horizontal position, said ledge being being located adjacent the vertical corner formed by the joining of the two arm portions and
   c. a flexible elongated strap member attached at one end to the ledge and being adapted to encircle an object that is to be plumbed, and keeper means on the exterior of the other arm portion for engaging the strap member along the length of the strap member for mounting the plumb tool to the object to be plumbed with a quick-attachment and quick-release capability;
   d. a substantially horizontal slot formed in each right-angular arm portion, and each slot being open at the outermost edge of its related arm portion, and each slot being generally located in a common horizontal plane that includes the ledge and the said keeper means, said slots being for use in receiving the strap member therein whenever the object to be plumbed has relatively small transverse dimensions that are smaller than the width of the arm portions.

2. The plumb tool invention as recited in claim 1, wherein the said ledge is provided with a horizontal bore hole for receiving the attachment end of the flexible strap member therein, and a compression spring positioned within the bore hole, and retaining means for joining the flexible strap member to the innermost end of the said spring whereby tension applied to the free end of the strap member will cause compression of the said spring, and removable means for closing one end of the said bore hole for confining the spring in place.

3. The plumb tool invention as recited in claims 1 or 2, wherein the said flexible strap member is a bead chain, and the said keeper means is a clip member that is mounted to one of the said arm portions adjacent the closed end of the said horizontal slot, and the keeper being adapted to engage the chain along the length thereof between any pair of adjacent beads.

4. The plumb tool invention as recited in claims 1 2 or 3 wherein the said pair of right-angular arm portions are hinged together along a central vertical axis whereby the two arm portions may collapse inwardly upon each other so the tool may become more compact for storing during non-use, and the said strap member may be wound around the collapsed body member and tied in place by the said keeper means.

* * * * *